July 3, 1962

H. HACK ETAL 3,041,881

METHOD AND DEVICES FOR DETERMINING VECTORIAL
QUANTITIES, PARTICULARLY FOR DYNAMIC
BALANCING OF ROTORS

Filed Jan. 15, 1959

United States Patent Office 3,041,881
Patented July 3, 1962

3,041,881
METHOD AND DEVICES FOR DETERMINING VECTORIAL QUANTITIES, PARTICULARLY FOR DYNAMIC BALANCING OF ROTORS
Heinrich Hack, Darmstadt, and Ludwig Arras, Gross-Zimmern, Germany, assignors to Carl Schenck Maschinenfabrik G.m.b.H., Darmstadt, Germany, a corporation of Germany
Filed Jan. 15, 1959, Ser. No. 786,946
Claims priority, application Germany Jan. 16, 1958
3 Claims. (Cl. 73—463)

Our invention relates to wattmetric methods and means for determining vectorial quantities by comparison of electric voltages and, in a particular aspect, to the determination of use of such methods and means for the dynamic balancing of rotors.

It is known to determine a vector, such as the unbalance of a rotor, as regards angular coordinate and magnitude, with the aid of wattmetric devices in which a measured alternating voltage, indicative of the unbalance or other vectorial magnitude, is compared with a sinusoidal reference voltage of the same frequency. Such wattmetric methods and devices obviate the exacting requirements for accurate filtering of the measured voltage as encountered with other known types of measuring apparatus. However, the wattmetric methods and devices heretofore available for such purposes, particularly for the dynamic balancing of rotors, leave much to be desired because they require a considerable expenditure in components and structure and often more personal attendance than desirable. This particularly applies to rotor balancing machines where the reference-voltage generator is not directly accessible to the operator of a balancing machine at his normal working place.

It is an object of our invention to improve the wattmetric methods and devices by greatly simplifying the necessary constructional means and reducing the amount of personal attendance required, while nevertheless securing an accurate and reliable performance.

According to the method of our invention, we compare a generally sinusoidal datum voltage, characteristic of the vector to be determined, with a reference voltage which we compose of two component sinusoidal voltages 90° phase displaced from each other, and we vary the phase of the resultant voltage by varying the respective amplitudes of the component voltages until the phase difference between the resultant voltage and the datum voltage is 0° or 90°.

In a device particularly suitable for performing the method according to the invention, the means for varying the voltage components of the resulting reference voltage comprise a twin-potentiometer of the type commercially available as sine-cosine potentiometer whose two groups of resistance windings are tapped by two respective sliders movable in synchronism with each other.

According to another, alternative feature of our invention, the means for varying the voltage components of the resultant voltage comprise two inductive transformers of the rotary type whose respective stators are angularly displaceable in synchronism with each other.

The invention is particularly favorable for the dynamic balancing of rotors with reference to one or more correction planes.

The above-mentioned and more specific objects, advantages and features of our invention, said features being set forth with particularity in the claims annexed hereto, will be apparent from, and will be mentioned in, the following in conjunction with the embodiments of the invention illustrated by way of example on the accompanying drawings in which:

The same reference characters are used in all illustrations for similar elements respectively.

Figure 1:
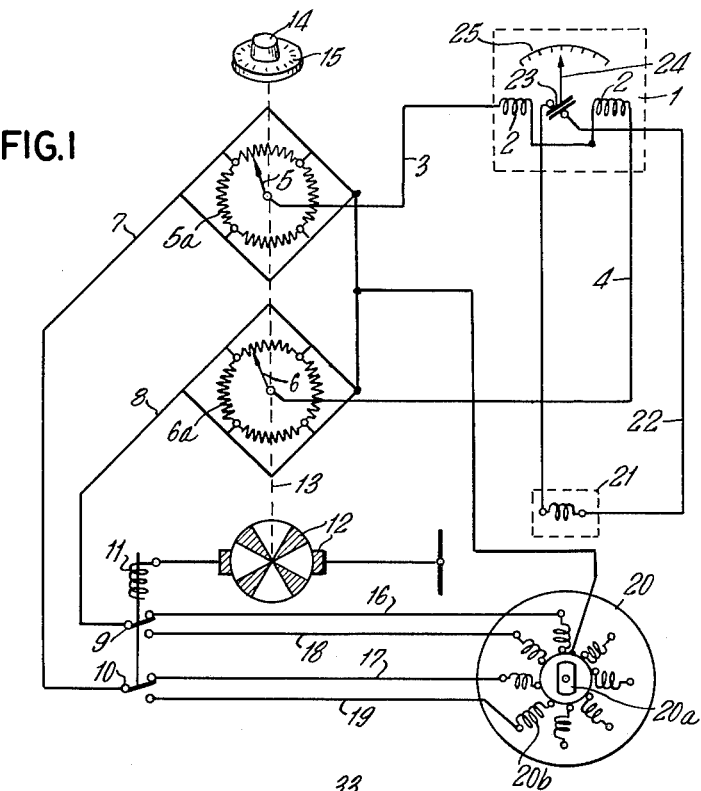
FIG. 1 is the electric circuit diagram of a wattmetric vector analyzing device.

The apparatus illustrated in FIG. 1 is provided with a wattmetric instrument 1 which comprises a pair of stationary field coils 2 acting upon a schematically illustrated moving coil 23. The field coils 2 are connected by leads 3 and 4 with respective displaceable tap contacts 5 and 6 of a twin-potentiometer operating in accordance with the known sine-cosine potentiometers. The twin-potentiometer possesses two ring-shaped systems of resistance windings 5a and 6a, each of which has four fixed tap points displaced 90° relative to each other. The four tap points of each system are connected by a lead 7 or 8 with a contact 9 or 10 of a switching relay 11 whose coil circuit is controlled by a commutator switch 12. The rotary, segmented contact member of switch 12 is mounted on a shaft 13 which also carries the potentiometer tap contacts 6, 5 and is provided with a manually operable knob 14 on a scale disc 15. The relay contacts 9 and 10 cooperate with respective pairs of stationary relay contacts which are connected by leads 16, 18 and 17, 19 with respective stator windings of a phase-reference generator 20. The generator has a rotatable armature 20a formed by a permanent magnet which, during continuous rotation, induces respective alternating voltages in the stator windings 20b.

The vector to be analyzed by the device is represented by an alternating voltage generated in a vibration-sensing transducer 21, such as an oscillation pickup of the moving-coil type. The datum voltage generated in transducer 21 is impressed in a circuit 22 upon the moving coil 23 of the wattmetric instrument 1. The instrument has a pointer 24 secured to, and movable together with, the moving coil 23 to cooperate with a scale of indicia 25.

When using the device for determining an unbalance vector of a rotating workpiece or a mechanical vibration caused by the rotation of structure, the member 21 may consist of a vibration pickup so that the voltage is indicative of any unbalance inherent in the workpiece or of the phase and magnitude of the vibration. In such cases, the rotor 20a of the reference generator 20 is operatively connected with the rotating structure to rotate in synchronism therewith. Consequently, the voltages induced in the generator coils 20b are likewise in synchronism with the rotation and hence also in synchonism with the datum voltage of transducer 21.

The voltages generated in those of the generator winding 20b that, at any one time, are connected by switching relay 11 with the two portions of the twin-potentiometer are 90° phase displaced from each other. These two sine and cosine voltages are applied to the field coils 2 of the wattmetric instrument 1. By manually rotating the knob 14, the proportion of the two component voltages taken by the respective tap contacts 5 and 6 from the resistance systems 5a and 6a and jointly impressed upon the wattmeter coils 2, are varied until the pointer 24 indicates a maximum or a minimum on the scale 25 of the wattmeter 1. When the indication is a maximum, the amount of the vector being analyzed is indicated by pointer 24 on scale 25. At the same time, the scale 15 indicates the angular position of the vector.

Setting the wattmeter 1 to minimum indication affords a more accurate indication of the angular position than is obtainable when setting the wattmeter to maximum indication. Of course, when reading the value indicated by scale 15, the difference of 90° is to be taken into account, depending upon whether maximum or minimum indication is chosen. By providing a change-over switch (not illustrated) the illustrated device can be made to operate sequentially with maximum indication and minimum indication, using only the one wattmetric instrument illustrated.

Figure 1A:
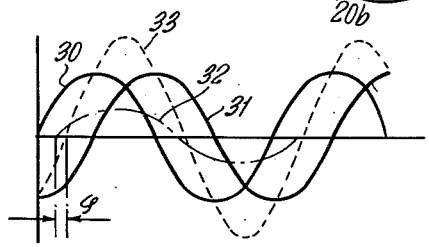
FIG. 1a is an explanatory graph of typical time curves of the voltages occurring in the device of FIG. 1 prior to adjusting an appertaining twin-potentiometer.

In the explanatory graph shown in FIG. 1a the ordinate represents time and the abscissa indicates voltage amplitude. Denoted by 30 is the time curve of the sine voltage supplied through the leads 16 and 8 when the twin-potentiometer is in zero position. Denoted by 31 is the time curve of the cosine voltage supplied through the leads 17 and 7, also when the twin-potentiometer is in zero position. Since the sine and cosine voltage are connected together, the field coils 2 of the wattmeter 1 are impressed by a resultant reference voltage corresponding to the curve 33 in FIG. 1a. This resultant reference voltage 33 is compared in the wattmeter with the datum voltage 32 supplied from pickup 21 to the moving coil 23 of the wattmeter. The phase displacement $\varphi$ existing at the potentiometer zero position between the reference voltage 33 and the datum voltage 32 being compared is eliminated by turning the knob 14, which has the effect of varying the proportions of the components 30 and 31 of the resultant reference voltage 33.

Figure 1B:
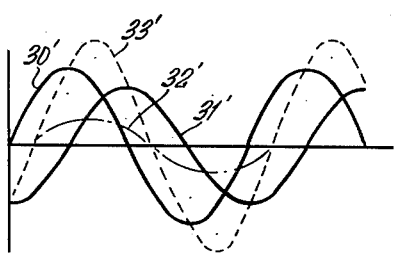
FIG. 1b is an explanatory graph indicating the corresponding voltage curves after adjustment of the twin-potentiometer.

The conditions obtaining when full compensation is effected in this manner are represented in the graph shown in FIG. 1b, where the component sine voltage is denoted by 30', the component cosine voltage by 31', the resultant reference voltage by 33', and the datum voltage by 32', the latter voltage retaining the same phase position as shown for curve 32 in FIG. 1a. Full compensation is established when the pointer 24 in the wattmeter indicates a maximum or a minimum, and the departure of the scale 15 from the zero position then indicates the amount of phase displacement $\varphi$. This indication is then in accordance with the angular position of the vector being analyzed, whereas the magnitude of the wattmetric maximum deflection is indicative of the quantitative coordinate of the same vector.

Figure 2:
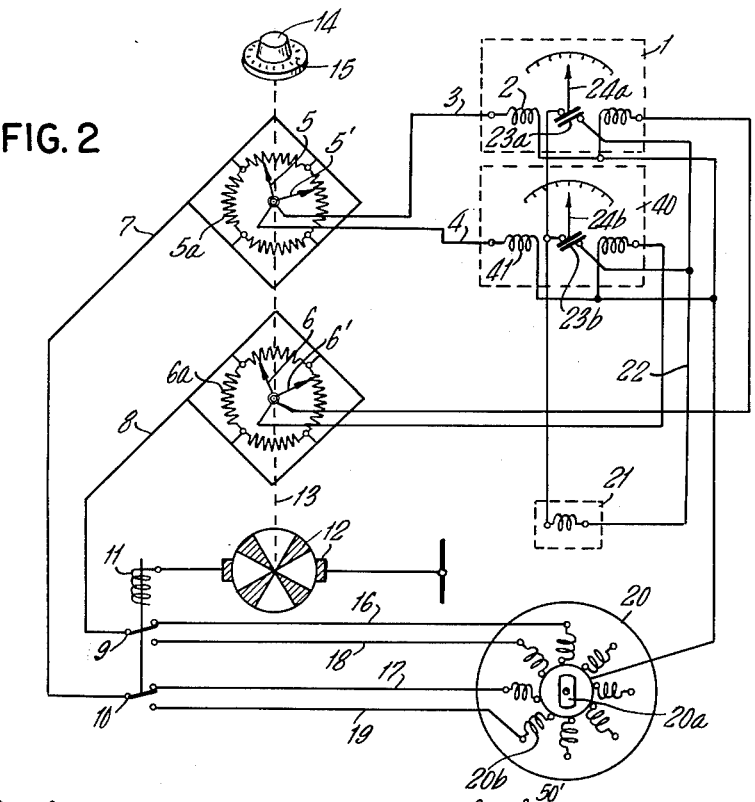
FIG. 2 shows the circuit diagram of another vector analyzing device equipped with two wattmetric instruments.

While a device in accordance with the embodiments shown in FIG. 1 can be set either for maximum indication or minimum indication at any one time, the modified embodiment shown in FIG. 2 is provided with a second wattmetric instrument 40 for simultaneous indication of maximum and minimum. The stationary field coils 41 of instrument 40 are connected with additional displaceable tap contacts 5' and 6' cooperating with the respective resistance windings 5a and 6a of the twin-potentiometer. The additional tap contacts 5' and 6' are 90° displaced relative to the respective tap contacts 5 and 6. The device is operated in substantially the same manner as described above with reference to FIG. 1. The knob 14 is to be turned from zero to a position in which one of the wattmeters indicates minimum or zero deflection. With this setting, the other wattmeter accurately indicates the quantity of the vector being analyzed, and the scale 15 indicates its angular position.

Figure 2A:
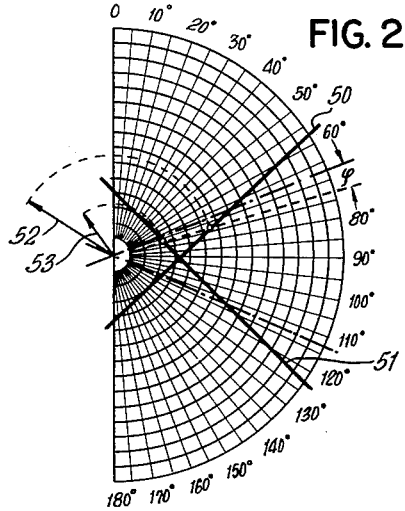
FIGS. 2a and 2b illustrate respective vector diagrams, indicative of the change of the sine-cosine components of the reference voltage for two different phase angles respectively of the datum voltage.

In the polar coordinate system of the graph shown in FIG. 2a the voltages occurring in the device of FIG. 2 are represented in form of a vector diagram. The component sine voltage is denoted by 50, and the component cosine voltage by 51. In accordance with the phase displacement of the datum voltage, characterizing the vector and generated in transducer 21, the component voltage value for the sine voltage is denoted by 52 and the corresponding component value of the cosine voltage by 53.

Figure 2B:
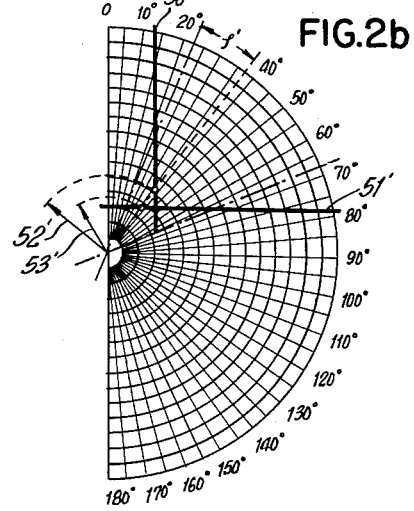

The amplitude variation of the sine and cosine values must be kept within given limits depending upon the rating of the field coils in the wattmetric instruments used for the measurement. For this purpose, and in accordance with another feature of the invention, the phase-reference generator 20 for producing the since and cosine voltages has a plurality of pairs of stator windings 20b, and the individual pairs are switched into the voltage supplying circuit by means of the switching devices 11, 12 in dependence upon the position of the potentiometric tap contacts and hence also in dependence upon the magnitude of the component voltages supplied to the wattmetric instrument or instruments. Thus, when the switch member 12 has the position illustrated in FIGS. 1 and 2, the relay 11 is deenergized and the contacts 9 and 10 are in the illustrated positions; but when the potentiometer tap contacts are turned to positions where the delivered component voltages are large, the contact segments of switch member 12 close the coil circuit of relay 11 and thus cause the contacts 9 and 10 to switch over to leads 18 and 19 which connect these contacts with differently rated generator coils 20b. FIG. 2b illustrates a vector diagram indicating the voltage components after such switching, the phase displacement between the resultant reference voltage and the datum voltage has the magnitude of $\varphi'$. In FIG. 2b the parameters denoted by 50', 51', 52' and 53' correspond to those denoted respectively by 50, 51, 52 and 53 in FIG. 2a.

Figure 3:
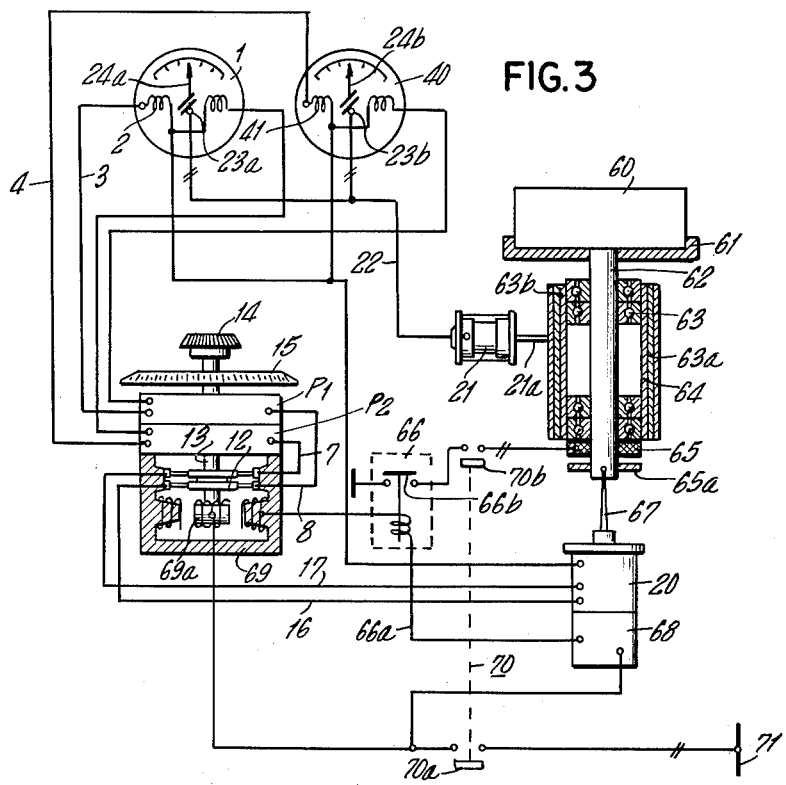
FIG. 3 illustrates schematically and partly in section the essential devices of a rotor balancing apparatus according to the invention, together with a circuit diagram of the associated electric components.

The balancing apparatus for rotors illustrated in FIG. 3 is represented by its essential mechanical and electrical components in conjunction with the appertaining circuit diagram drawn in straight, single-line fashion. The rotatable workpiece 60 to be balance-analyzed or balance-corrected is mounted on a holder or chuck 61 secured to a spindle 62 which is journalled in ball bearings 63. The bearings are mounted in a rigid sleeve structure 64 which is connected with the rigid and stationary machine frame structure by elastic means 63a and 63b, so that the rotatable spindle-holder-workpiece assembly can oscillate horizontally in the plane of illustration when, during rotation of the spindle at the proper operating speed, the assembly is excited to oscillations due to any unbalance inherent in the workpiece 60.

Mounted at the lower end of spindle 62 is an electromagnetic brake 65, which when energized under control by a contactor 66, prevents rotation of the spindle 62 and hence of the workpiece 60. The magnetic brake forms part of a control device for setting the workpiece into the correct angular position required for eliminating the analyzed unbalance by means of machining, as will be more fully described hereinafter. A cardanic or universally deflectable linking shaft 67 join the spindle 62 with a phase-reference generator 20 so that this generator is driven in synchronism with, and in a fixed phase relation to, the rotation of the workpiece 60. The generator corresponds to the generator 20 described above with reference to FIGS. 1, 2 and supplies sine and cosine voltages through leads 16 and 17 through a twin switch 12 to the respective portions P1 and P2 of a twin-potentiometer designed and operating as described with reference to FIG. 2. The output terminals of the two potentiometer portions are connected by respective leads 3 and 4 with the stationary field coils 2 and 41 of two wattmetric instruments 1 and 40, the respective moving coils 23a and 23b of the instruments being mechanically joined with the pointers 24a and 24b. The shaft 13 of the twin-potentiometer is provided with a manually operable knob 14 and a scale plate 15 for operation in the same manner as described above with reference to FIG. 2. Joined with shaft 13 is a commutator switch 12 applicable for the purposes also described above with reference to FIGS. 1 and 2.

Further mounted on the shaft 13 of the potentiometric device is the rotatable member 69a of a synchro-receiver electrically connected with a synchro-transmitter 68 whose rotating coil is joined with the shaft of the phase generator 20 to rotate together therewith and in fixed relation thereto. The synchro-connection between the potentiometer shaft 13 and the spindle 62 of the workpiece-accommodating assembly forms part of the above-mentioned control device for positioning the workpiece as required for the unbalance-correcting machining operation, as will be more fully described below. However, further details of the synchro-components are not described herein because they are well known as such for the purpose of transmitting a rotational position. For example, reference may be had to the book "Servomechanism Practice" by William R. Ahrendt, published 1954 by McGraw-Hill Book Company, Inc., New York, pages 30 to 38. A synchro-connection suitable for the purpose of the invention is also described more fully in my copending application Serial No. 606,929, filed August 29, 1956 for Methods and Apparatus for Compensation of Rotor Unbalance, assigned to the assignee of the present invention (FIGS. 9, 10). The electric connections of the commutator switch 12 are not shown in FIG. 3 because they correspond with those described above with reference to FIGS. 1 and 2.

The unbalance-responsive oscillations of the rotor assembly are sensed by an electrodynamic pickup 21 whose sensing member 21a is mechanically connected with the bearing sleeve 64. The pickup 21 issues its voltage through lead 22 to the moving coils 23a and 23b of both wattmetric instruments 1 and 40.

The vector of rotor unbalance is measured as to magnitude and angular position in the same manner as described above with reference to FIG. 2. When thus the angular position of the unbalance vector is indicated by the potentiometer displacement shown on scale 15, and the unbalance magnitude is indicated by the pointer deflection of the wattmeter 40, the rotor 60 is to be placed into the correct angular position required for eliminating the unbalance by machining the rotor with the aid of a machining tool, such as a drill press, of fixed location relative to the frame structure of the machine. For this purpose, the switch 70 is actuated to close its contacts 70a, 70b. Contact 70a now energizes the synchro-system by alternating current from a supply line 71 of normal utility frequency (50 or 60 c.p.s.). Initially, as a rule, the workpiece 60 will not be in the correct angular position, so that the angular position of the synchro-member 68 does not correspond to that of synchro-member 69. Consequently, an equalizing current will flow in the circuit 66a which interconnects the stators of the two synchro members. Hence the contactor 66 in equalizing circuit 66a is energized so that its contact 66b is open. By now turning the rotor 60 slowly about its axis, the rotor will reach the correcting machining position. At that moment the equalizing current in circuit 66a ceases so that contactor 66 is deenergized and closes its contact 66b. Contact 66b energizes through closed switch contact 70c the magnetic brake 65 which then rigidly secures the spindle 62 with workpiece 60 in the correct position, so that the necessary machining operation can be performed in accordance with an amount indicated by wattmeter 40.

Figure 4:
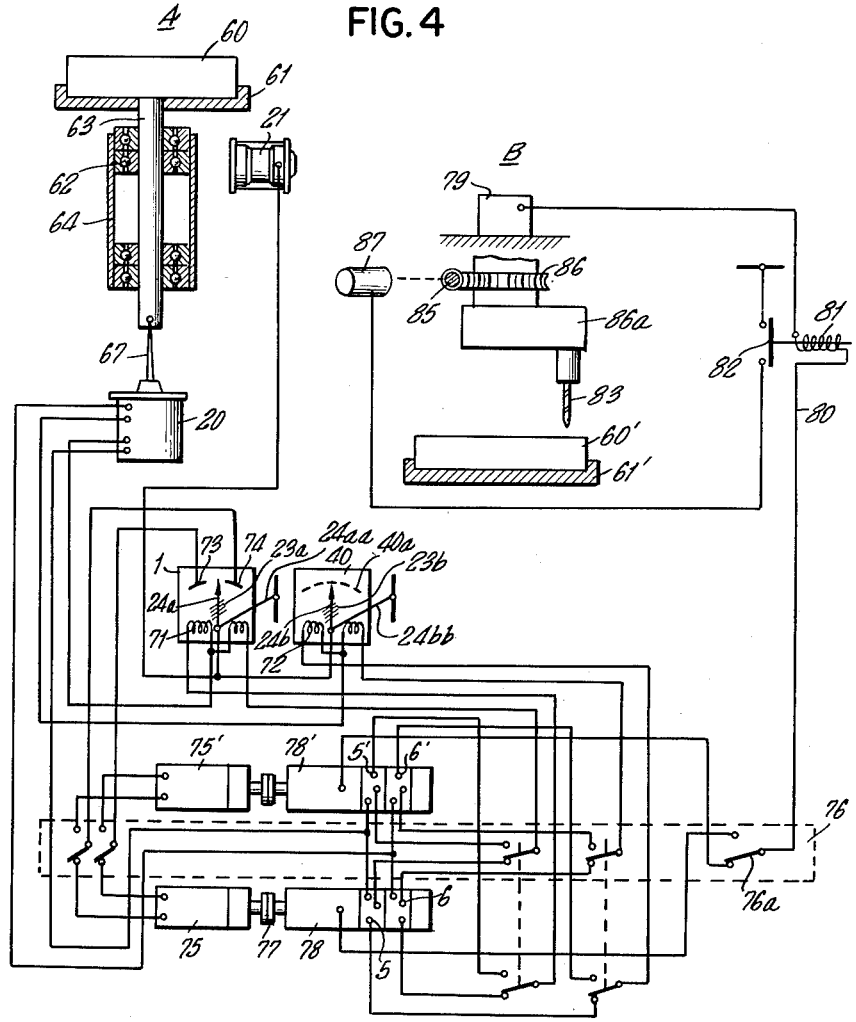
FIG. 4 illustrates, in a similar manner as FIG. 3, a more elaborate balancing apparatus according to the invention, which is equipped with memorizing means for storing the measured values and for controlling a balance-correcting machine in response to the measured values.

The embodiment shown in FIG. 4 exemplifies the invention with reference to a plant for fully automatic balancing of workpieces. The balancing is performed in two separate stations A and B. In station A the unbalance of the workpiece is measured as to magnitude and angular position. In station B the measured unbalance is corrected by machining. This type of balancing is being used in modern assembly line production. It requires that the unbalance values measured in station A be stored in memorizing equipment for subsequent use in the balance-correcting operation. It is further necessary to provide a plurality of memorizing devices if, during the period of time in which one workpiece is being machined for balance correction, another workpiece is to be analyzed for unbalance.

In station A, the workpiece 60 is connected by a holder or chuck 61 with the machine spindle 63, which is journalled by ball-bearings 62 in a bridge structure or sleeve 64 capable of performing elastic oscillations in the horizontal direction in response to any unbalance of the workpiece. The unbalance-responsive datum voltage generated in the electrodynamic oscillation pickup 21 is impressed upon the moving coils 23a and 23b of two wattmetric devices 1 and 40. Connected with the spindle 63 by a cardanic link 67 is a phase generator 20 corresponding to those described above. The phase generator supplies a sine current for the field coil 71 of wattmeter 1, and a cosine current for field coil 72 of the wattmeter 40. During rotation of workpiece 60 in station A, the moving coil 23a and the pointer 24a in wattmeter 1 are deflected in accordance with the phase position of the unbalance so that the pointer deflection is indicative of the angular coordinate of the unbalance vector to be determined. The pointer 24a also serves as a movable contact member and, for this purpose, is connected by a lead 24aa with a current source. The pointer 24a when deflected enters in given intervals of time into contact with two stationary contact pieces 73, 74. When the pointer deflection is toward the left so that the pointer engages the contact pieces 73, a reversible motor 75 is energized to run in a given direction, assuming that the illustrated reversing switch 76 has its contacts located in the position shown in FIG. 4. When the pointer 24a of wattmeter 1 deflects toward the right and engages the contact piece 74, the motor 75 is energized for rotating in the opposite direction. The motor 75 drives through a clutch or coupling 77 a synchro-transmitter 78 and simultaneously turns the shaft of a twin-potentiometer 5, 6 corresponding to those described above with reference to FIG. 1. As explained with reference to the preceding embodiments, such displacement of the twin-potentiometer has the effect of setting the deflection in wattmetric instrument 1 to zero, while the deflection in the other instrument 40 reaches a maximum.

As also explained, the amount of rotational displacement of the twin-potentiometer effected by the motor 75 is then indicative of the angular coordinate of the unbalance vector, and the amount of deflection of pointer 24b in instrument 40 is indicative of the magnitude of the vector.

When the wattmeter 1 is thus set to zero, the synchro-transmitter 78 has assumed a given angular position which corresponds to the angular position of the unbalance in workpiece 60. The motor 75 is provided with a self-locking reduction gear (not shown). Consequently, the just-mentioned angular position of the synchro-transmitter 78 remains preserved after the unbalance-analyzing system is disconnected from the motor 75. The synchro-transmitter 78 thus acts as a memorizing device for subsequently controlling the unbalance correcting operation in station B. When the synchro-transmitter 78 is set in the manner just described, the workpiece 60 can be removed from station A and can be transferred to station B where it is denoted by 60'.

Now the switch 76 is actuated. This has the effect of connecting the synchro-transmitter 78 through switch contact 76a and lead 80 with a synchro-receiver 79 in series with a relay 81. At the same time, the switch 76 connects the electric components of station A with a second set of data-storing devices 75', 78', 5', 6' corresponding to those denoted by 75, 78, 5 and 6 respectively. The station A is now ready for testing another workpiece and for memorizing its unbalance data in the second synchrotransmitter 78'.

The transmission of the angular position from synchrotransmitter 78 through lead 80 to synchro-receiver 79 is effected by supplying the synchro system through another switch contact (not illustrated in FIG. 4, but corresponding to contact 70a in FIG. 3) with alternating current of fixed frequency, such as 50 or 60 c.p.s. The equalizing current of the synchro system then flows through the lead 80 and causes relay 81 to close its contact 82 thus energizing a position-control motor 87. The motor drives a worm 85 meshing with a worm gear 86 on the support of a drill-carrier 86a, thus turning the carrier about an axis 84 which coincides with the rotational axis of the workpiece 60' and is also identical with the axis of the synchro-receiver 79.

The workpiece 60' is placed upon the fixed holder 61' in a position which, with the aid of suitable marker means, corresponds exactly to the position previously occupied by the same workpiece in the holder 61 of the balance-measuring station A. Consequenlty, the rotation of the tool carrier 68a about its axis by operation of motor 87 has the effect of placing the drill 83 into various angular positions relative to the workpiece. When the drill 83 arrives at the correct angular position, corresponding to that of the unbalance previously determined in station A, the equalizing current in lead 80 ceases and relay 81 drops off so that contact 82 de-energizes the motor 87. In this manner the drill 83 is automatically set to the position for unbalance correction.

The drilling depth may also be controlled automatically. This can be done by connecting the drill feed motor with the wattmeter device 40 which, for this purpose, is provided with a bank 40a of stationary contact selectively engageable by the pointer 24b. The pointer, thus serving as a movable contact arm, is connected through a lead 24bb with a current source and thus supplies current to the one bank contact selected in accordance with the pointer deflection. The selected control circuit then operates to terminate the drill feed when the proper drilling depth and hence the proper amount of unbalance correction is attained. Details of the latter control means are not further described herein because they may be given the same design and operation as illustrated and described in the above-mentioned application Serial No. 606,929 with reference to FIGS. 9 to 11.

While in the embodiments so far described, the potentiometer devices for selectively apportioning the sine and cosine components of the resultant reference voltage are of the ohmic resistor type, it should be understood that voltage apportioning devices of other type are likewise applicable for the purposes of the invention, such as potentiometric devices of the inductive type. A particularly favorable and simple design is obtained if, according to another feature of the invention, the twin-potentiometric device consists of a variometer-type transformer. By correspondingly mounting the windings of such a transformer in the proper angular relation to each other, the secondary side of the transformer device furnishes a resultant voltage similar to that available from the corresponding tap contacts of the twin-potentiometers described above, the primary side of the transformer device being energized by alternating current from a phase-reference generator corresponding to the energization of the resistance-type potentiometers described above.

Figure 5:
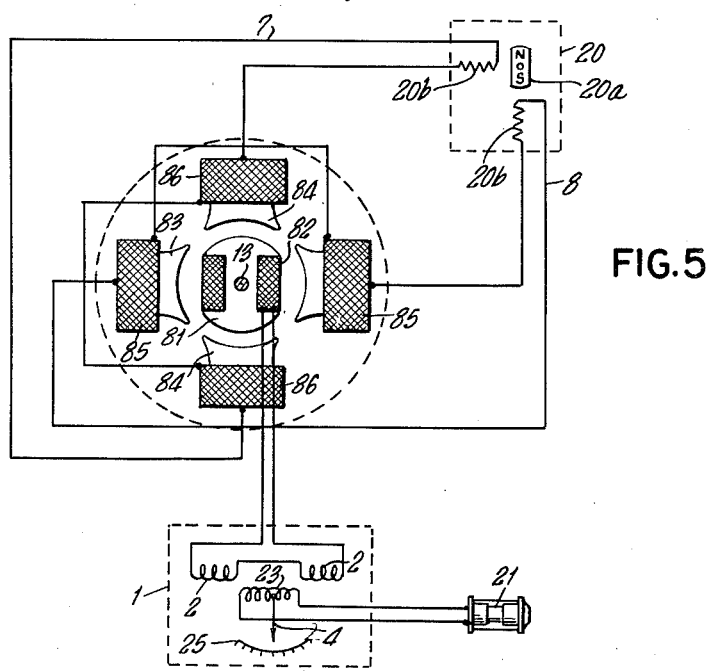
FIG. 5 illustrates a rotary transformer operating as an inductive potentiometer in a device according to the invention.

An example of one of the above-mentioned rotary transformers suitable as a potentiometric device is illustrated in FIG. 5. The transformer has a core member 81 mounted on the manually or automatically rotatable shaft 13. The rotatable member 81 carries a winding 82. The magnetizable stator structure of the transformer has two pairs of pole shoes 83 and 84 whose respective axes intersect each other at an angle of 90°. The pole shoes 84 carry respective portions of a primary winding 86 for supplying a sine voltage. The pole shoes 83 carry the portions 85 of another winding for supplying a cosine voltage.

The transformer windings 86 are connected to the sine-voltage winding 20b, and the transformer windings 85 to the cosine-voltage winding of phase generator 20. The winding 82 on the rotatable portion is connected to the field coils 2 of the wattmetric instrument, whose moving coil 23 receives datum voltage from pickup 21. It will be recognized that the system shown in FIG. 5 is essentially similar to that illustrated in FIG. 1 and described above, except that the resistance-potentiometer device is substituted by the induction-potentiometer device.

Two induction potentiometers according to FIG. 5 may also be combined to a twin device, which have a single control shaft 13 and a single control knob 14 as shown in FIG. 2 in common, and whose respective output circuits are connected to two instruments as shown at 1 and 40 in FIG. 2 or FIG. 3. The jointly and synchronously rotatable windings of the twin-transformer then permit varying the resultant reference voltages in the same manner as the movable tap contacts of the resistance-type twin-potentiometers according to FIG. 2 or FIG. 3.

It will be understood by those in the art, upon studying this disclosure, that the invention is amenable to various other modifications and hence may be embodied in apparatus other than particularly illustrated and described herein, without departing from the essence of our invention and within the scope of the claims annexed hereto.

We claim:

1. Apparatus for balancing a rotating workpiece, comprising a transducer for providing an alternating datum voltage in accordance with unbalance-responsive oscillations of the rotating workpiece, voltage supply means having two component alternating voltages synchronous with said datum voltage and 90° phase-displaced from each other, said voltage supply means having circuit means for superimposing said two component voltages upon each other to form a resultant reference voltage, wattmetric means having two input circuits connected to said transducer and to said circuit means respectively to be controlled by said datum voltage and said reference voltage, said wattmetric means having an output member responsive to the product of said datum and reference voltages, potentiometric means forming part of said voltage supply means and having displaceable structure for varying the proportion of said two component voltages to set the phase angle between said resultant reference voltage and said datum voltage to a selected one of the values 0° and 90°, whereby the amount of displacement of said structure is indicative of the angular position of the workpiece unbalance and the maximum response of said member is indicative of the unbalance magnitude, said output member of said wattmetric means forming a movable contact, two stationary contacts engageable by said movable contact when said movable contact deflects from zero position in one and the other direction respectively, a reversible motor mechanically connected with said displaceable structure, and a control circuit connecting said two stationary contacts with said motor for operating the motor in opposite directions respectively depending upon which of said two stationary contacts is engageable by said movable contact at a time, whereby said potentiometric means are controlled by said motor to set said wattmetric output member to zero.

2. Appaatus for balancing a rotating workpiece, comprising a transducer for providing an alternating datum voltage in accordance with unbalance-responsive oscillations of the rotating workpiece, voltage supply means having two component alternating voltages synchronous with said datum voltage and 90° phase-displaced from each other, said voltage supply means having circuit means for superimposing said two component voltages upon each other to form a resultant reference voltage, wattmetric means having two input circuits connected to said transducer and to said circuit means respectively to be controlled by said datum voltage and said reference voltage, said wattmetric means having an output member responsive to the product of said datum and reference voltages, potentiometric means forming part of said voltage supply means and having displaceable structure for varying the proportion of said two component voltages to set the phase angle between said resultant reference voltage and said datum voltage to a selected one of the values 0° and 90°, whereby the amount of displacement of said structure is indicative of the angular position of the workpiece unbalance and the maximum response of said member is indicative of the unbalance magnitude, a reversible motor mechanically connected with said displaceable structure of said potentiometric means, and control means connected with said motor and responsive to departure of said wattmetric output member from a given zero condition, whereby said potentiometric means are controlled by said motor to set said output member to said zero condition.

3. Balancing apparatus according to claim 2, comprising a synchro-system having a synchro-member joined with said motor to be rotationally adjusted together with said potentiometric means, whereby said synchro-member stores for subsequent use the measured angular position of workpiece unbalance.

References Cited in the file of this patent

UNITED STATES PATENTS

| | | |
|---|---|---|
| 2,241,615 | Plebanski | May 13, 1941 |
| 2,706,399 | Federn | Apr. 19, 1955 |
| 2,810,307 | Hack | Oct. 22, 1957 |
| 2,821,858 | King | Feb. 4, 1958 |
| 2,909,948 | Gruber | Oct. 27, 1959 |

FOREIGN PATENTS

| | | |
|---|---|---|
| 715,136 | Great Britain | Sept. 8, 1954 |
| 735,802 | Great Britain | Aug. 31, 1955 |
| 784,768 | Great Britain | Oct. 16, 1957 |